United States Patent
Anderson

(10) Patent No.: US 7,266,383 B2
(45) Date of Patent: Sep. 4, 2007

(54) GROUP INTERACTION MODES FOR MOBILE DEVICES

(75) Inventor: Eric Anderson, Gardnerville, NV (US)

(73) Assignee: Scenera Technologies, LLC, Portsmouth, NH (US)

( * ) Notice: Subject to any disclaimer, the term of this patent is extended or adjusted under 35 U.S.C. 154(b) by 385 days.

(21) Appl. No.: 11/057,896

(22) Filed: Feb. 14, 2005

(65) Prior Publication Data

US 2006/0182045 A1    Aug. 17, 2006

(51) Int. Cl.
H04B 7/00    (2006.01)

(52) U.S. Cl. ............ 455/518; 455/418; 370/338; 709/203

(58) Field of Classification Search ........... 455/418, 455/500, 507, 517, 518; 370/260, 328, 338; 709/203, 206
See application file for complete search history.

(56) References Cited

U.S. PATENT DOCUMENTS

| | | | |
|---|---|---|---|
| 5,768,633 A | 6/1998 | Allen et al. ............ 396/2 |
| 6,091,956 A | 7/2000 | Hollenberg | |
| 6,332,579 B1 | 12/2001 | Ritter | |
| 6,449,473 B1 | 9/2002 | Raivisto | |
| 6,542,740 B1 | 4/2003 | Olgaard et al. | |
| 6,639,975 B1 | 10/2003 | O'Neal et al. | |
| 6,668,167 B2 | 12/2003 | McDowell et al. ........ 455/433 |
| 6,670,982 B2 | 12/2003 | Clough et al. | |
| 6,741,271 B1* | 5/2004 | McConica et al. ........ 715/839 |
| 6,816,722 B2 | 11/2004 | Blom et al. | |
| 6,930,709 B1 | 8/2005 | Creamer et al. | |
| 6,937,850 B2 | 8/2005 | Lippelt | |
| 6,967,675 B1 | 11/2005 | Ito et al. | |
| 6,990,561 B2* | 1/2006 | Yae et al. ............ 711/154 |
| 7,054,618 B1 | 5/2006 | McCullough | |
| 7,085,360 B1 | 8/2006 | Sprouse | |
| 7,130,616 B2* | 10/2006 | Janik ............ 455/412.1 |
| 2002/0022474 A1 | 2/2002 | Blom et al. | |
| 2002/0023132 A1* | 2/2002 | Tornabene et al. ....... 709/205 |
| 2002/0115454 A1 | 8/2002 | Hardacker ............ 455/457 |
| 2002/0174248 A1 | 11/2002 | Borriss ............ 709/238 |
| 2002/0184311 A1 | 12/2002 | Traversat et al. ........ 709/204 |
| 2002/0188735 A1* | 12/2002 | Needham et al. ........ 709/229 |
| 2003/0007464 A1 | 1/2003 | Balani ............ 370/310 |

(Continued)

FOREIGN PATENT DOCUMENTS

EP    1058450    12/2000

(Continued)

*Primary Examiner*—Edward F. Urban
*Assistant Examiner*—Nhan T. Le

(57) ABSTRACT

A method and system for providing group interaction modes in a local area network (LAN) for attendees of an event having mobile devices capable of communicating with the local area network is disclosed. One aspect includes providing a shared data pool on the LAN with data created by a provider of the event prior to the event; and providing the LAN with a group mode. The group mode includes functions for enabling attendees to create user data pools on the LAN from their mobile devices during the event; enabling a mobile device to upload digital image data captured during the event to the LAN for storage in the corresponding user data pools; and enabling a mobile device to download the data stored in both the shared data pool and other attendee's user data pools for storage, such that one attendee receives the digital image data submitted by the other attendees.

42 Claims, 4 Drawing Sheets

U.S. PATENT DOCUMENTS

| | | |
|---|---|---|
| 2003/0030839 A1 | 2/2003 | Walters et al. |
| 2003/0058343 A1 | 3/2003 | Katayama |
| 2003/0078959 A1 | 4/2003 | Yeung et al. |
| 2003/0081581 A1* | 5/2003 | Clark et al. .................. 370/338 |
| 2003/0135576 A1 | 7/2003 | Bodin ........................ 709/213 |
| 2003/0200297 A1 | 10/2003 | Wiener |
| 2003/0208534 A1 | 11/2003 | Carmichael et al. |
| 2003/0208541 A1 | 11/2003 | Musa ........................ 709/205 |
| 2003/0208543 A1 | 11/2003 | Carmichael ................. 709/203 |
| 2003/0225701 A1 | 12/2003 | Lee et al. |
| 2003/0227554 A1 | 12/2003 | Kazami et al. |
| 2003/0236832 A1 | 12/2003 | McIntyre et al. |
| 2004/0032498 A1 | 2/2004 | Wyn-Harris et al. |
| 2004/0039813 A1 | 2/2004 | Clark et al. |
| 2004/0082326 A1 | 4/2004 | Shaw et al. |
| 2004/0082351 A1 | 4/2004 | Westman .................... 455/518 |
| 2004/0098515 A1 | 5/2004 | Rezvani et al. |
| 2004/0132449 A1 | 7/2004 | Kowarsch |
| 2004/0137882 A1 | 7/2004 | Forsyth ................... 455/414.1 |
| 2004/0153504 A1 | 8/2004 | Hutchinson ................. 709/204 |
| 2004/0184478 A1* | 9/2004 | Donescu et al. ............ 370/462 |
| 2004/0185826 A1 | 9/2004 | Koskinen et al. |
| 2004/0196312 A1 | 10/2004 | Powers et al. .............. 715/753 |
| 2004/0248547 A1 | 12/2004 | Philsgard et al. |
| 2004/0249086 A1 | 12/2004 | Randall et al. |
| 2004/0249922 A1 | 12/2004 | Hackman et al. |
| 2005/0027608 A1 | 2/2005 | Wiesmuller et al. |
| 2005/0113123 A1* | 5/2005 | Torvinen .................... 455/519 |
| 2005/0245233 A1 | 11/2005 | Anderson |
| 2005/0277412 A1 | 12/2005 | Anderson et al. |
| 2006/0013197 A1 | 1/2006 | Anderson |
| 2006/0014520 A1 | 1/2006 | Anderson et al. |

FOREIGN PATENT DOCUMENTS

| | | |
|---|---|---|
| TW | 493348 | 7/2002 |

* cited by examiner

GROUP INTERACTION MODES FOR MOBILE DEVICES

CROSS-REFERENCE TO RELATED APPLICATIONS

The present application is related to co-pending U.S. patent application Ser. No. 10/903,931 entitled "Automatic Remote Services Provided by a Home Relationship Between a Device and a Server," filed on Jul. 29, 2004.

FIELD OF THE INVENTION

The present invention relates to computer networks, and more particularly to a method and system for automatically providing group interaction modes in a LAN for attendees of an event having mobile devices in communication with the LAN.

BACKGROUND OF THE INVENTION

A wireless LAN is a local area network that transmits over the air. Typically, one or more wireless base stations, which are also referred to as access points, are wired to an Ethernet network, while wireless adapters are either built into or attached to client devices. The access points and the wireless devices communicate via radio frequency over an area of several hundred feet through walls and other barriers. If there are multiple access points as in a corporation, for example, then roaming devices can be handed-off from one access point to another. One example of a wireless LAN standard today is 802.11, also called Wi-Fi. For short distances between two devices, a wireless personal area network (PAN) may be used, such as Bluetooth. Bluetooth is an open standard for short-range transmission of digital voice and data between local devices, such as laptops, PDAs, imaging devices, phones, and desktop devices.

One application for a wireless LAN is in the home for connecting two or more computers/devices. A home LAN is often the same Ethernet network found in companies, except that the home network is typically configured as one network, whereas a company may have many sub networks for traffic and security purposes. Another application for a wireless LAN is so called "hot spots" in which public locations, such as coffee shops, hotels, restaurants, airports, etc., provide wireless internet access to end-users utilizing Wi-Fi standards.

Not only is the number of wireless mobile devices being introduced to the market steadily increasing, but as technology improves, the types of devices equipped with wireless technology will also grow. For, example, wireless phones, camera-phones, and PDA's already exist. In addition, some watches are wireless, as are some digital cameras. There are many reasons to believe that these devices will become even more common as wireless devices, and that many multi-functional units, such as phones+camera+PDA devices that already exist, will become commonplace. Currently, each wireless device is designed to work with any device connected to it that has appropriate connectivity, such as software and/or hardware drivers.

When a user is carrying a device capable of wireless networking with them, they are currently limited in what they can do when within the service area of a wireless local network. Typically, wireless networks are secure (no access), or, if not secure, then of unknown capability. A certain level of technical expertise is required to make anything work, and the range of possibilities is limited typically to devices from the same manufacturer or devices from a group of manufacturers.

In addition, one mobile device can interact with another mobile device only when specifically directed by the user, such as when deciding to "beam" a file from one PDA to another person's PDA, for example. With existing wireless networks and devices, there are no known sustained interaction modes for transitory (spatial) or selected groups of devices/people.

Currently, the primary way a mobile device user interacts with another mobile device is to request a connection from his device, such as entering a phone number, selecting a device from a Bluetooth device list, or asking a friend to set up to receive an IR beam. Each of these mechanisms is somewhat cumbersome, some more so than others, and they can distract from human interaction—i.e., they require concentration and attention by the device user, which can diminish the enjoyment of the social interactions. There is little, if any known support for enabling multiple mobile devices to simultaneously communicate with one another.

Accordingly, given the proliferation of hot spots and wireless devices, there exists a need for a method and system that unlocks the potential of wireless devices. More particularly, what is needed is a method and system for automatically providing a LAN with group interaction modes for attendees of an event having mobile devices in communication with the LAN. The present invention addresses such a need.

SUMMARY OF THE INVENTION

The present invention provides a method and system for automatically providing group interaction modes in a local area network (LAN) for attendees of an event having mobile devices capable of communicating with the local area network. One aspect of the present invention includes providing a shared data pool on the LAN with data created by a provider of the event prior to the event; and providing the LAN with a group mode. The group mode includes functions for enabling attendees to create user data pools on the LAN from their mobile devices during the event; enabling at least a portion of the mobile devices to upload digital image data captured during the event to the LAN for storage in the corresponding user data pools; and enabling at least a portion of the mobile devices to download the data stored in both the shared data pool and other attendee's user data pools for storage, such that one attendee receives the digital image data submitted by the other attendees. A further aspect of the present invention includes providing the LAN with a guest services mode that includes functions for providing each of the mobile devices having an established relationship with a home network pass-through access to the home network via an Internet connection, and for selectively forwarding to each mobile device's home network the data in the shared data pool.

DETAILED DESCRIPTION

Figure 1:
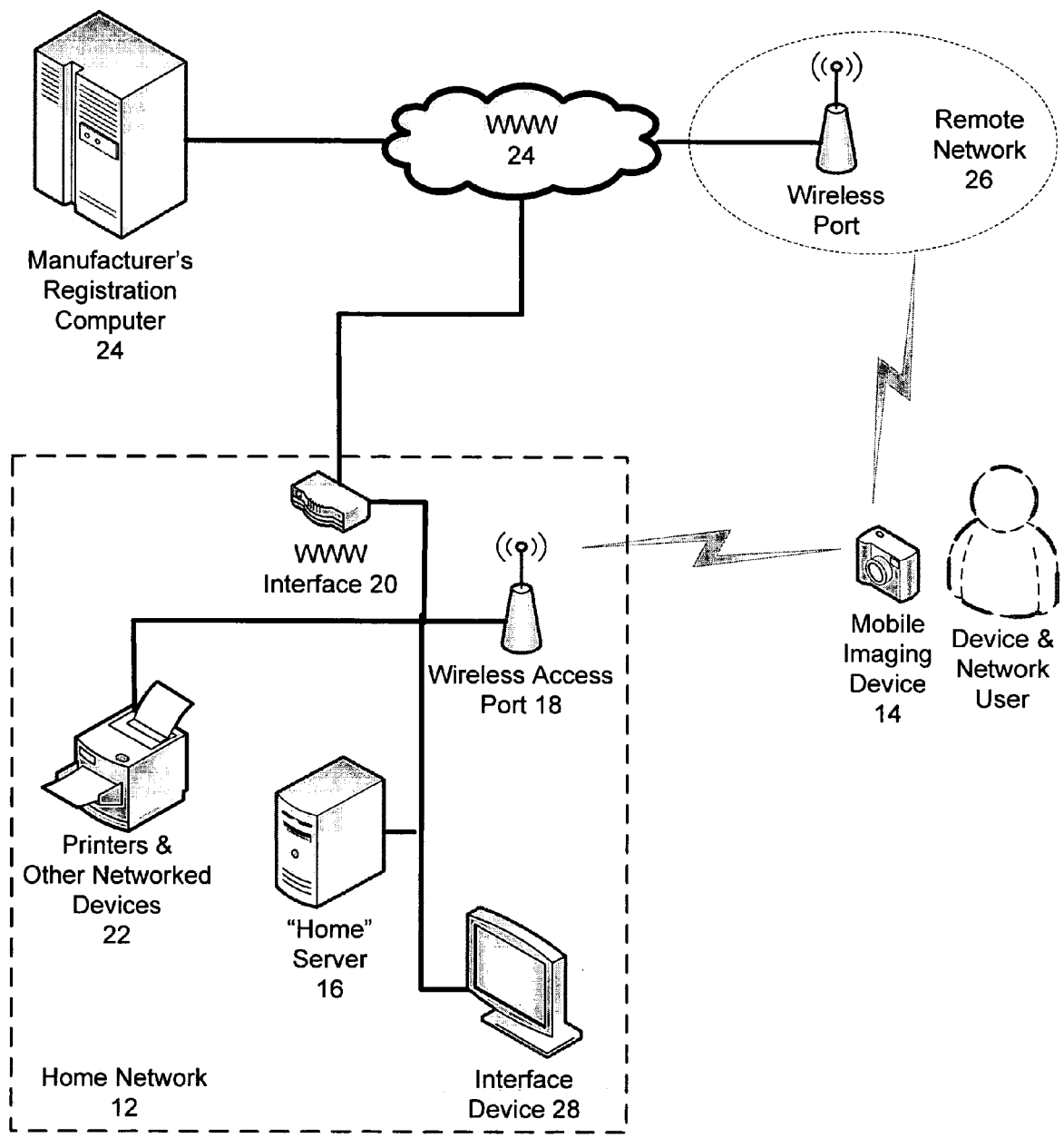
FIG. 1 illustrates a preferred embodiment of a system for providing automatic remote services for a device through the establishment of a "home" relationship with a network server in accordance with the present invention.

The present invention provides a method and network for automatic remote services between a device and a home network, and for automatically providing group interaction modes in a LAN for attendees of an event having mobile devices in communication with the LAN. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

In a first aspect, the present invention provides a method and system for automatic remote services for wireless mobile device through the establishment of a "home" relationship between the device and a server. First, a home relationship is established between the device and a home network in which information identifying the device is stored on a server within the home network that allows the server to interact with the device, and information identifying the home network is loaded into the device to enable the device to interact with the home server. Once this relationship is established, the server may be configured to perform automatic services for the device, such as uploading images from a camera phone to the server when the camera phone is detected by the home network. According to the preferred embodiment of the present invention, however, these automatic services may be provided by the server even when a user of the mobile device is traveling and the mobile device comes in contact with other local networks or hotspots. In the remote case when the mobile device detects a local network away from home network, information packets within the device allow the device to establish a VPN-like "tunnel" to the home server from any local network access point providing Internet access. The local area network provides the mobile device with pass-through access to the home server, and in response, the home server recognizes the connection and operates as if the device was local, including providing the automatic services a user has previously selected. An example the present invention is a user on vacation in which the user has captured images using a camera phone or wireless digital camera. As a user travels to various locations, the device may detect local hotspots, such as at a coffeehouse, or airport, for example. Once the device gains Internet access through the local network and contacts the home server, the home server recognizes the device through the pre-established home relationship and automatically uploads the images from the device, freeing the device to capture more images, all without user intervention.

In a second aspect, the present invention provides a method and system that enables a wireless local area network to support group interaction modes for mobile devices during an event. When a group event is held, such as a party, convention, conference, or meeting, many of the attendees will carry mobile devices with them. The location where the event is to be held—a home, a business, a resort, hotel or restaurant, can provide network services to the attendees, preferably in the form a wireless local area network (LAN). This can take the form of Wi-Fi or Bluetooth, depending on the size of the gathering and the area that must be covered. Rather than have the LAN simply provide connection service to the Internet, according to a preferred embodiment, the network also provides special group interaction modes. One of the group interaction modes includes a guest services mode that provides each of the mobile devices having an established relationship with a home network pass-through access to the home network via an Internet connection. Another group interaction mode is a guest services mode that is based on the remote services described with respect to the first aspect of the present invention. The guest services mode enables at least a portion of the mobile devices to both upload data stored within each of the mobile devices to the LAN for storage in a shared data pool and to download the data stored in the shared data pool for storage on the device, such that one attendee receives the data submitted by the other attendees of an event.

FIG. 1 illustrates a preferred embodiment of a system for providing automatic remote services for a device through the establishment of a home relationship with a network server in accordance with the present invention. In a preferred embodiment, the system 10 comprises a wireless home network 12 capable of wireless communication with a wireless mobile device 14. The home network 12 includes at least one server 16, which is operated by a user/owner/administrator through an interface device 28. The server 16 is coupled to one or more wireless access points (transceivers) 18 through a LAN interface (e.g., Ethernet router) 20. Other stationary devices 22 may also be coupled to the LAN interface 20 over a wired LAN, such as a printer, fax machine, music jukebox, and the like. The LAN interface 20 provides all the devices within the home network access to the Internet 24. Although not shown, the mobile device 14 includes a CPU or DSP, volatile and non-volatile memory, a network interface that enables wireless communication, and device specific components for carrying out the intended function of the device 14. In a preferred embodiment of the present invention, the mobile device is capable of capturing images, such as wireless digital camera or camcorder, a camera phone, or a camera-equipped PDA, for example. Also, the server 16 may comprise a standard PC, a network server, or a media server.

When the user purchases the mobile device 14, the home relationship can be established between the server 16 and the mobile device 14. Besides establishing a "home" relationship with the mobile device 14, the server 16 can also establish home relationships with other devices, such as printers and other networked devices 22. The relationship established between the network 12 and the wireless device 14 is the identification of the network 12 or network server 16 as "home" from the point of view of the wireless device 14; and is the identification of an "owned device" from the point of view of the network server 16. The server 16 is capable of connecting to a registration server 24 of a particular owned device through the Internet 24 via the Internet interface 20.

Figure 2:
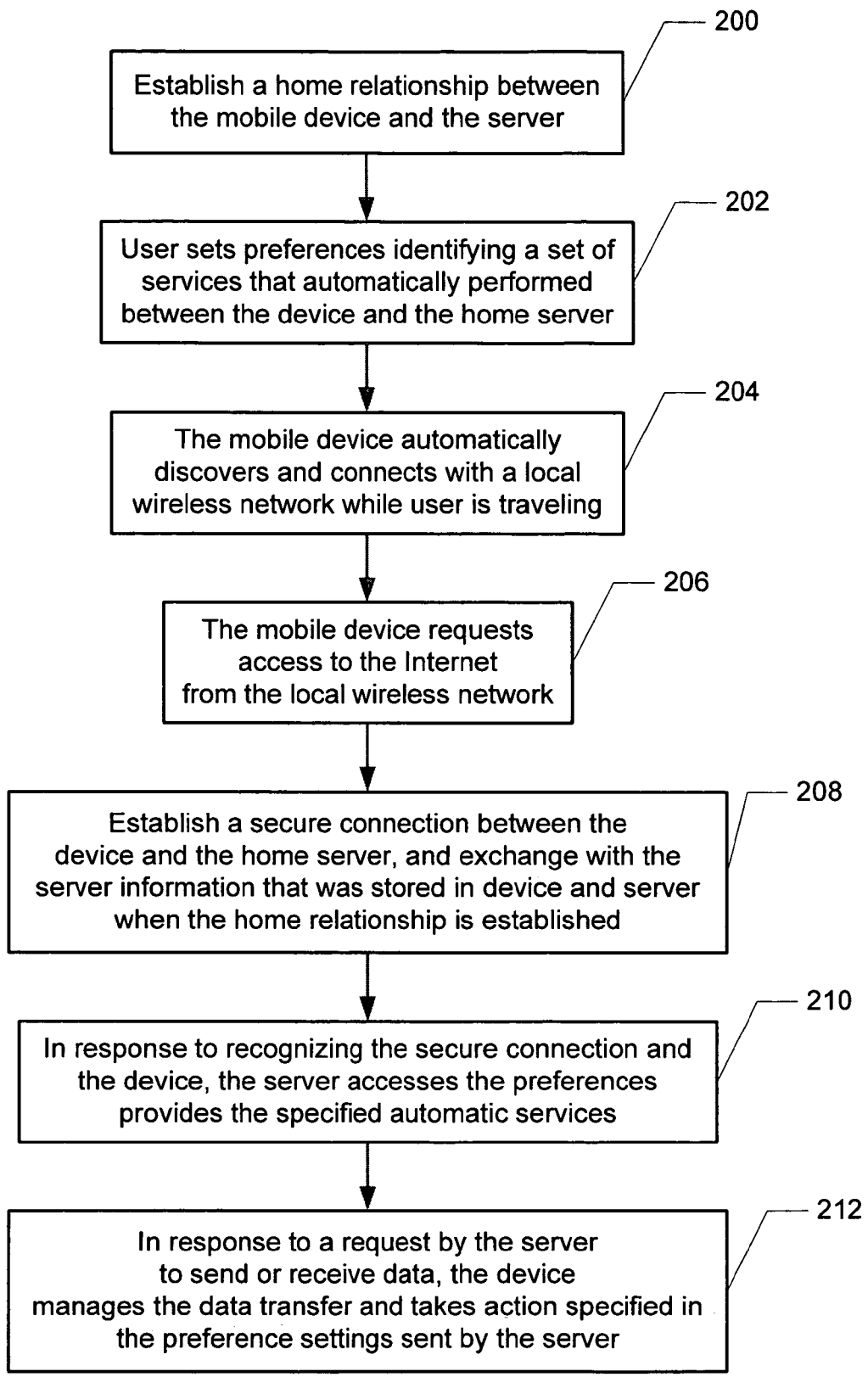
FIG. 2 is a flowchart illustrating a process for providing automatic remote service for the device through the establishment of a home relationship with the network server in accordance with the present invention.

FIG. 2 is a flowchart illustrating a process for providing automatic remote service for the device 14 through the establishment of a home relationship with the network server 16 in accordance with the present invention. The process begins by establishing a "home" relationship between the mobile device 14 and the server 16, via step 200, such that no additional configuration is required by the user 106 of the mobile device 14 to communicate over the home network once the relationship is established. The establishment of the "home" relationship is further described in the co-pending U.S. patent application entitled "Establishing a Home Relationship between a Wireless Device and a Server in a Wireless Network", Ser. No. 10/833,381, filed on Apr. 28, 2004 and incorporated herein by reference.

The process is briefly described here for convenience. When first activating the device 14, the built-in wireless networking capability of the device 14 interacts automatically with the local wireless network 12. Once communication is established, and before any data interactions can proceed, the nature of the relationship between the device 14 and server/network 16 and 12 must be established. This is accomplished by a notification/response between the network and the device 14. The network server 16 attempts to recognize the device 14 by requesting device identification from the mobile device 14. The device identification is information that uniquely identifies the mobile device 14, such as a device ID, serial number, etc. The mobile device 14 responds with its device ID. If the device ID is found in an "owned device" database or list (not shown) at the network server 16, then the mobile device 14 is granted access to the network as being part of the home network 12.

If the device ID is not found, then no pre-existing relationship exists. The network server 16 then seeks authorization from the user to create the home relationship via an audible and/or visual indication that user interaction is required. The user selects from a presented menu from a set of possible relationships. One selection is to establish the network as "home" for the device. When this option is selected by the user, information about the device 14, the device ID, is loaded into the server 16 to allow the server to recognize the device 16 in the future, and likewise, information identifying the server/network 16 is loaded into the device 14 to enable it to interact with the server 16. Information loaded into the device 14 for identifying the server 16 may include an IP address of the server or information necessary for establishing a secure connection, such as a Virtual Private Network (VPN). For business networks, the "home" selection would only be made if the device was owned by the business.

Once the "home" relationship is established between the mobile device 14 and the network server 16, the mobile device 14 recognizes the network as its home network, and the network server 16 recognizes the mobile device 14 as an "owned" device that is an extension of the network. Using the "home" relationship, the mobile device 14 is granted automatic access to the network. Although the preferred embodiment is described above with a "home" relationship established between the network server 16 and the mobile device 14, other types of relationships can be established between the network server 16 and the mobile device 14 without departing from the spirit and scope of the present invention.

After the user authorizes the creation of a home relationship, the user in step 202 sets preferences identifying a set of functions or services that are automatically performed between the device 14 and the home server 16 when a connection is made. In a preferred embodiment, the user is prompted to set preferences by the display of a preference page(s) or form(s). The types of services that may be specified are explained below.

Referring to both FIGS. 1 and 2, in step 204 after the user specifies preferences for automatic services, the user may carry around the device 14 and the mobile device 14 may automatically discover and make a connection with a local wireless network 26. Such local wireless networks may be found in public locations, such as coffee shops, hotels, restaurants, airports, etc., as well as private locations, such as corporations and other people's homes.

In step 206, the mobile device 14 requests access to the Internet from the local wireless network 26. This may require having an account with a service provider, such as T-MOBILE, for example, and thus may require exchange of password and ID. The service provided by the local network 26, enabling a connection to be made between the device 14 and it's home network 22 is called "Guest" access. Providing guest access to a local network in this manner is disclosed in co-pending patent application Ser. No. 10/893,806 "Method and System for Supporting Guest Services Provided by a Wireless LAN", filed on Jul. 19, 2004, and herein incorporated by reference.

After obtaining Internet access, in step 208 the device 14 establishes a secure connection to the home server 16 over the Internet and exchanges with the server 16 information stored in the device and server when the home relationship was established with the server 16. In a preferred embodiment, the secure connection to the home server 16 is established using a Virtual Private Network (VPN) that establishes a "tunnel" to the home server 16 from any network access point providing internet access. Since there is no connection to the network 26 other than a secure "pipe" of data flow between device 14 and home network 22, there is no security issue. The secure connection is established directly—the only service being provided by the remote network 26 is the transport of wireless data to the Internet backbone.

In a preferred embodiment, the information stored in the device 14 includes the name or IP address of the server or VPN information, and unique identification information. The IP address of the server or VPN information is used to establish communication with the home server 16. Thereafter, the device transmits device identifying information (e.g., device ID) to the server 16 and the server 16 transmits network identifying information to the device 14 to establish automatic access.

In an alternate embodiment, a secure connection is established between the device 14 and the home server 16 via a set of encryption keys created when the home relationship was established. In this case, one key of a key pair is held by the device 14 and the other is held by the server 16. The key pair is based on well known public/private key technology, and allows a secure connection by using the keys to encrypt and decrypt messages between the device 14 and server 16. In addition, a mechanism for establishing a connection with the home server 16 is required that would allow passage through a home firewall and router, potentially using NAT (Network Address Translation) if multiple computing device 14s were included on the home network. This mechanism could include technology within the firewall, or a service provided externally. In the latter case, the external service has a connection established from the home server 16, and is contacted by the mobile device 14 rather than directly to the home network. The service thus would provide a connection between the device 14 and home server 16, device 14.

When accessing sensitive information from the home server 16, an additional authentication step may be required, to ensure that the user of the device 14 is the real owner. This is important to protect sensitive data in the case when the device 14 is stolen. This authentication step can be as simple as entering a PIN number, or could be a text password, or some biometric information, such as a fingerprint or thumbprint recognizer. If the device 14 itself requires authentication when powered up—typical for many mobile device 14s—then the user is already pre-identified as the owner, and no additional step of authentication for accessing sensitive data is required.

In step 210, in response to recognizing the secure connection and the device 14, the home server 16 accesses the preferences and provides the specified automatic services, operating as if the device 14 was local. In the preferred embodiment where the device 14 is an imaging device, such as a camera-phone or digital camera, an example of an automatic service specified in the preference settings is the uploading of new images in the device 14 to the home server 16.

Preferably, image uploads are accomplished in a stepwise manner, allowing partial uploads to be completed at a later time. Assuming a connection is made via a wireless network provided by a restaurant, for example, when the user is standing outside looking at the menu, a new image transfer may begin. If the user decides to pass on the restaurant, and begins walking away, at some point the wireless connection will be broken. Whatever portion of the image transferred will be held, to be completed during later connections.

When an image is completely transferred, there are a number of possible options that may be offered to the user to manage the images within the imaging device 14. The options include:

1. Delete the successfully transferred image completely.
2. Delete the full-size image, and leave a thumbnail image that can be displayed on the device's display. In this case, the thumbnail may be marked as transferred on the display. Several delete options may be displayed to the user, such as "Delete ALL," "Delete This One," "Delete Selected" and "Delete All Transferred." Since a thumbnail is much smaller than the full-size images, the thumbnail images may remain in the imaging device 14 after the images are transferred to the server 16 at that, if the user so desires. These thumbnail images cannot be zoomed on the display unless the full-size images are first retrieved from the server 16.
3. Mark all transferred images as transferred. The user can "free up" memory in the camera by selecting the option "Delete All Transferred."

In addition, an icon or other mark can be displayed on the thumbnail image after images are transferred. For example, an icon may be displayed in one portion of the thumbnail, to indicate that the full-size image has been transferred to the server. For instance, a zoom icon with a red circle and line to it may be used to indicate an image transfer, and a green icon may be displayed on other thumbnails is to indicate that the full-size images are still present in the device 14. This is helpful information for the device 14 user, allowing selective erasure of images no longer needed in the device 14.

Another automatic service that may be provided in the preference settings is to download images or data from the server 16 to the imaging device 14. This would allow, for example, the user to receive images sent from other imaging devices 14 by friends, family, or business associates.

In a further embodiment, the services that the user may select in the preferences may include product registration; software updates; server operating software to support device; other network device software to support the device; options and accessories. These services include automated software or firmware updates, automatic system software selection and installation, automatic software installation for other network devices to support the mobile device, and special offerings.

Referring again to FIG. 1, to provide automated software or firmware updates, registration information for the mobile device 14 and the server 16 is provided to the registration server 24. The registration server 24 can then connect to the server 16 in the future when software or firmware updates are available for the mobile device 14. If updates are available, they are automatically downloaded and installed on the mobile device 14 by the network server 16. Further details on how this may be implemented are described in co-pending patent application Ser. No. 10/893,806 "Automatic Registration Services Provided Through a Home Relationship Established Between a Device in a Local Area Network," filed on Jul. 19, 2004, which is herein incorporated by reference.

As the server 16 scans the preferences, the server 16 may perform several functions in sequence. For example, to respond to the setting "automatically transfer images", the server 16 may check if images are available in the device 14, compare those images to images previously uploaded, create a list of images to the transferred from the device 14, and then instructs the device 14 to transfer the identified images. The home server 16 may also transfer those preference settings to the device 14 that the server 16 determines require action by the device 14.

Referring again to FIG. 2, in response to a request by the server 16 to send or receive data, in step 212 the device 14 manages the data transfer and takes action specified in the preference settings sent by the server. Such actions may include performing selected operations on transferred data, such as marking transferred data as transferred, and partially deleting (leave thumbnail) or deleting transferred images. One of the preferences may be to store images received from other devices in an in basket. In the preferred embodiment, the in-basked would be secure as well, eliminating any spam from being received.

Other services can include access to home network functions, such as baby room video cameras, room microphones for listening, air conditioner/heater controls, home weather station, etc. In the example of heating and air conditioning, the device 14 could access current home temperature and outside temperature, as well as current heating/cooling system settings. If the user had the system set to start cooling or heating 1 hour before coming home, and had a schedule change, the settings could be modified directly from his mobile device 14.

Although the preferred embodiment has been described in which image data is transferred between the device 14 and the server 16, any other forms of data can be transferred, such as text, MP3 files, spreadsheets, presentations, documents, and commands.

Group Interaction

The second aspect the present invention provides a method and system for enabling a local area network (LAN) to support group interaction modes for mobile devices during an event. The event may be any private or public gathering of people in which some or all of the attendees of the event carry mobile devices. Examples of such events include a party, convention, conference, sporting event or concert, for instance. Events can be hosted in practically any location, such as a home, a business, a resort, a hotel, a restaurant, museum, or stadium, for instance. The main criteria for the event is that it provide network services to the attendees, preferably in the form of a wireless local area network (LAN), although a wired LAN or combination thereof may also be used.

Figure 3:
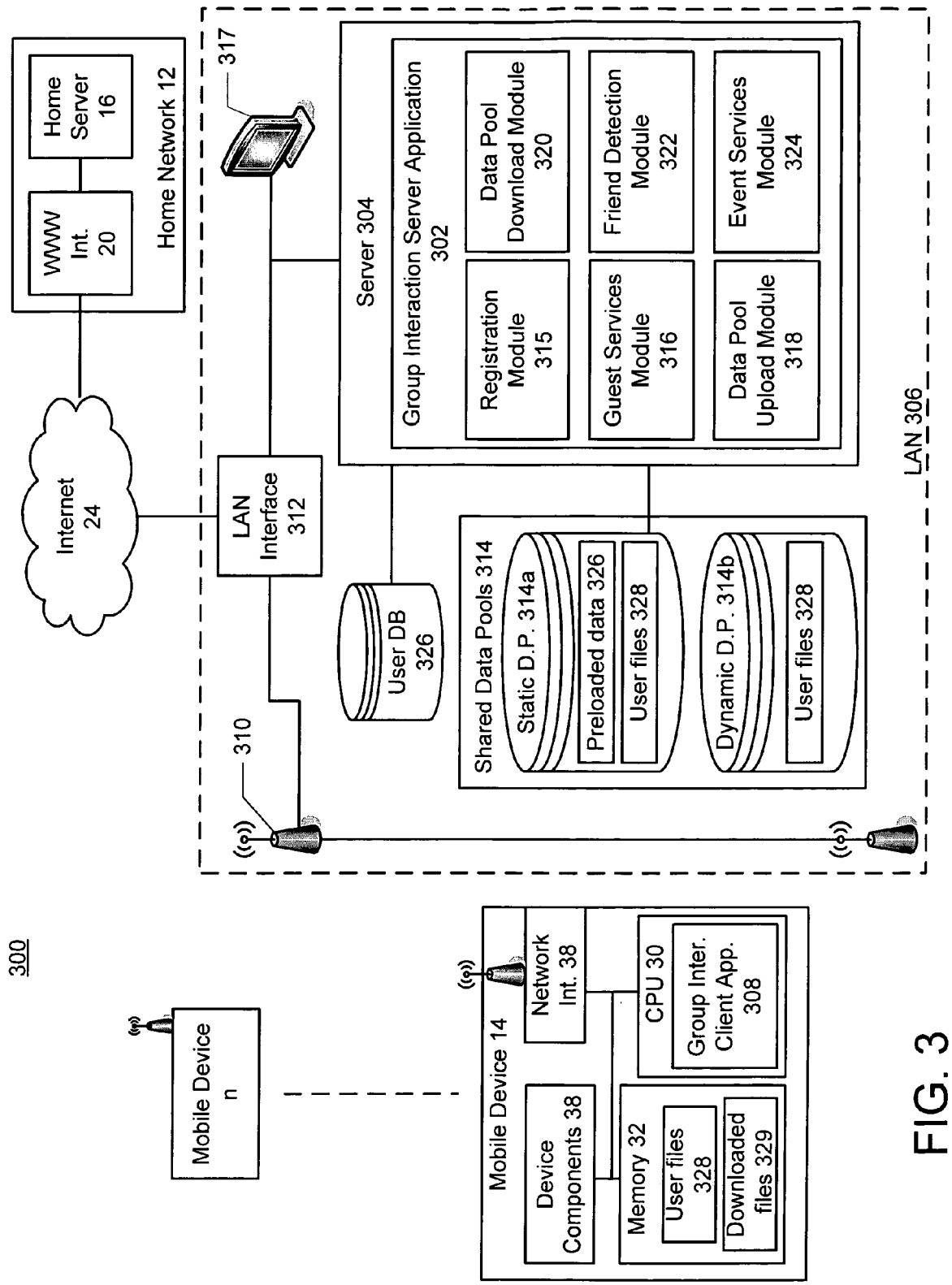
FIG. 3 is a block diagram illustrating a preferred embodiment of a system for enabling a LAN to support group interaction modes for mobile devices during an event in accordance with the present invention.

FIG. 3 is a block diagram illustrating a preferred embodiment of a system for enabling a LAN to support group interaction modes for mobile devices during an event in accordance with the present invention, where like components from FIG. 1 have like reference numbers. The system 300 primarily includes a group interaction server application 302 running on a server 304 of a LAN 306 at a location of an event, and a group interaction client application 308 running on multiple mobile devices 14 carried by attendees of the event. The server 304 may comprise a standard PC, a network server, or a media server that is provided by the entity hosting or affiliated with the event. The server 304 is coupled to one or more access points (transceivers) 310 through a LAN interface (e.g., Ethernet hub) 312, which is also connected to the Internet 24. The group interaction server application 302 may be executed on the same computer as the server 304 or on a different computer.

As stated above in a preferred embodiment, each mobile device 14 is a device such as a wireless digital camera or camcorder, a camera phone, or a camera-equipped PDA that is capable of capturing images. Each mobile device 14 includes a CPU or DSP 30, nonvolatile memory 32, a network interface 36 that enables wired or wireless communication, and device specific components 38 for carrying out the intended function of the device 14. In addition, at least a portion of the mobile devices 14 have a pre-established relationship with respective home networks 12 of the mobile device user. In addition, the home networks 12 may be capable of providing automatic remote services for the mobile device 14 as describe above. In a preferred embodiment, the functionality for the remote services is provided in part by the group interaction client application 308.

In a preferred embodiment, the group interaction server application 302 includes several modules including a registration module 315, a guest services module 316, a data pool upload module 318, a data pool download module 320, a friend detection module 322, and an event services module 324. In addition, the LAN 306 further includes a user database 326, shared data pools 314, and optionally one or more display devices 317 distributed around the event location. In an alternative embodiment, the functionality of the group interaction server application 302 may be provided by a configuration of modules different from the one described in the preferred embodiment.

Figure 4:
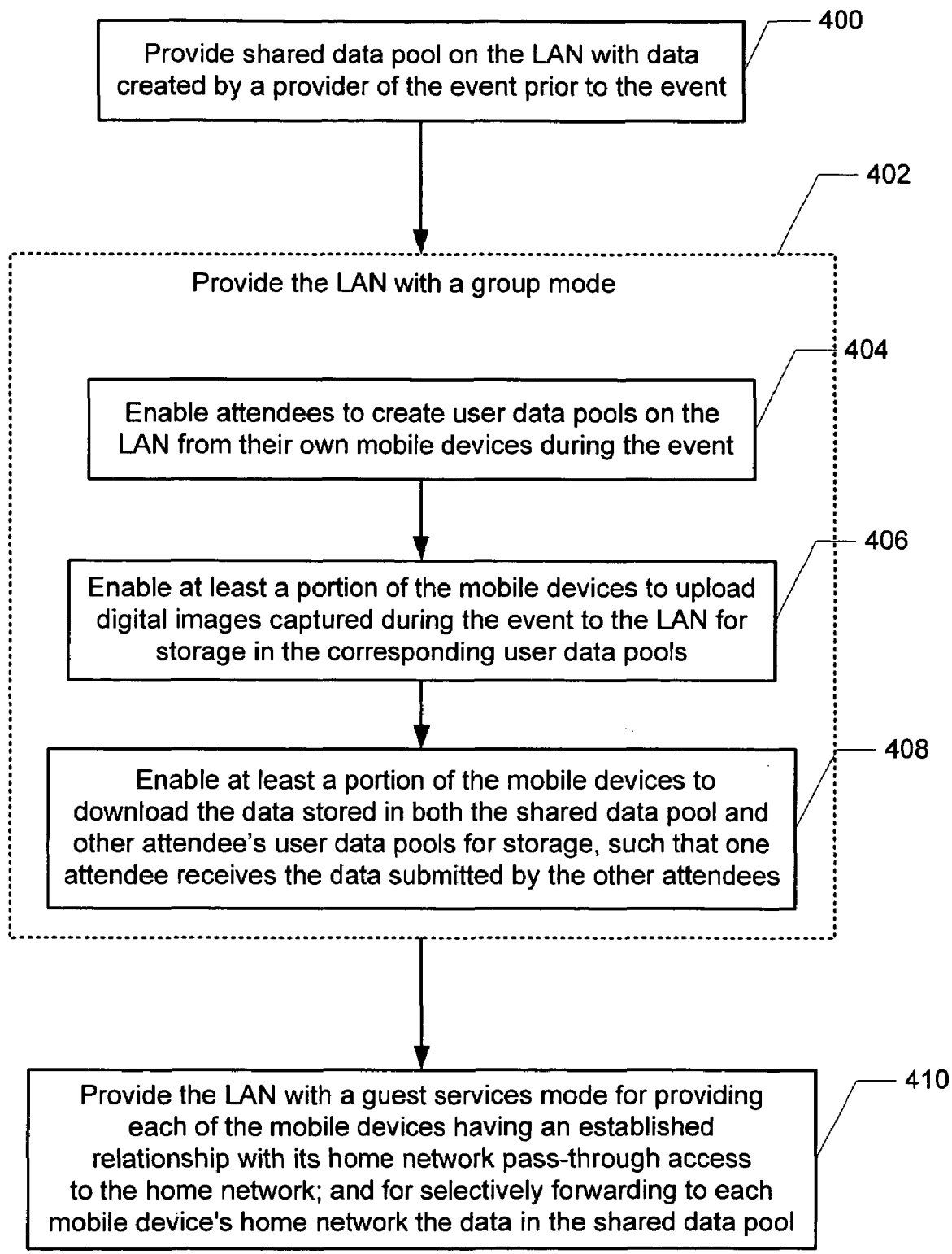
FIG. 4 is a flow diagram illustrating the process for automatically providing group interaction modes in a LAN for attendees of an event having mobile devices in communication with the LAN.

FIG. 4 is a flow diagram illustrating the process for automatically providing group interaction modes in a LAN for attendees of an event having mobile devices in communication with the LAN. In a preferred embodiment, the LAN group interaction modes are provided by the group interaction application server 302 and the group interaction client application 308 in conjunction with the shared data pools 314.

The process begins in step 400 in which the shared data pool 314 on the LAN 306 is provided with data created by a provider of the event prior to the event. In a preferred embodiment, the data provided by the provider of the event is stored in the static data pool. 314a. In step 402, the LAN 306 is provided with a group mode, shown by the dashed-line. In a preferred embodiment, the group mode includes the following functions. In step 404, the group mode includes a function for enabling attendees to create user data pools, preferably referred to as dynamic data pools 314b, on the LAN 306 from their own mobile devices 14 during the event. In step 406, the group mode includes a function for enabling at least a portion of the mobile devices 14 to upload digital image data captured during the event to the LAN 306 for storage in the corresponding user data pools. In step 408, the group mode includes a function for enabling at least a portion of the mobile devices 14 to download the data stored in both the shared data pool 314 and other user data pools for storage, such that one attendee receives the data submitted by the other attendees.

Referring to both FIGS. 3 and 4, the functionality for the group mode is primarily provided by the data pool upload module 318 that uploads user files 328 from one mobile device 14 for storage in the shared data pool 314, and the data pool download module 320 for downloading the data in the shared data pool 314, including the user files 328, to other mobile devices 14.

In a preferred embodiment, the guest mode includes two private sub-modes. In one private mode the attendees may configure their mobile devices 14 to receive data offered by the LAN 306 from the shared data pool 314, but not offer any to the shared data pool 314. In the second private mode, the attendees may configure their mobile devices 14 to both receive data from the shared data pool 314 and to add data to the shared data pool 314, but the uploaded data is stored in a private non-sharing mode.

Referring to FIG. 4, in step 410, the LAN 306 is provided with a guest services mode that includes functions for providing each of the mobile devices 14 having an established relationship with its home network 12 pass-through access to the home network 12 via an Internet 24 connection; and for selectively forwarding to each mobile device's home network 12 the data in the shared data pool. The guest services mode is the basic service supported by the LAN 306 and is based on the remote services provided by a home relationship between a mobile device 14 and a home network 12 described above.

Referring to both FIGS. 3 and 4, the functionality for guest services mode is provided primarily by the guest services module 316, which allows an attendee to access their home server 12 and internet locations from their mobile devices 14 via the LAN 306, but does not offer interaction with either the host network facilities (other than pass-through) or a mobile devices 14 of other guests. This is the basic service on which other services are added.

As stated above, the group mode allows attendees access to the shared data pool 314. In a preferred embodiment, the shared data pool 314 includes at least one static data pool 314a and dynamic data pools 314b. The purpose of both the data pools 314a and 314b is to enable the sharing of data among mobile devices 14 of the attendees in a controlled manner at an event. The static data pool 314a is created by the provider of the event prior to the event, while the dynamic data pools 314b are created by individual attendees from their mobile devices 14 anytime during the event. The data in the data pools 314 may include any type of data including documents, images, videos, contact lists, audio files, and so on.

The static data pool 314 may be empty at the start of the event and populated with event data during the event like a dynamic pool 314b, or can include preloaded data pertaining to the event 326 provided by from the provider the event. The preloaded data 326 can include attendees contact list, attendee photos, papers, presentations, special offers, and so on. During the event, any attendee may upload user files 328 from their mobile device 14 to the shared data pool 314, particularly images and audio captured during the event. For example, a speaker can offer his/her presentation to the static data pool 314a from his mobile device 14, or event attendees can add photos they take at the event to either the static data pool 314a or the dynamic data pools 314b that they spontaneously created at the event. The attendees can also add images taken prior to the event to the static data pool 314a. The provider of the event and/or third party affiliates of the event may also add to the static data pool 314a during the event. At a conference for example, the provider of the event may add updated schedules, papers, and presentations, and photos taken during conference. At a concert for instance, a third-party professional photographer may be hired by the concert promoters to add real-time photos of the concert to the data pool 314a.

The group interaction client application 308 can be pre-loaded onto the device 14 anytime before the event, e.g., a download from the web, or the group interaction client application 308 can be an application downloaded at the event during registration. An installation applet can be installed on the device 14 that determines what OS and processor, and the like are being used in the device 14, so that the correct version of the group interaction client application 308 can be downloaded. In some cases, the device 14 may not support the group interaction client application 308, in which case the interface with group interaction server application 302 is simulated on the device 14 through a browser running in the device 14, where posted data is presented via hyperlinks on a web page.

As attendees and their mobile device 14 enter the range of the LAN 306, the device 14 is recognized by the registration module 315 and offered the group mode and guest services mode. The device 14 can be preconfigured by the owner to automatically accept such offers, or can be set to "announce" such that the offer is displayed to the user for acceptance or rejection. If no action is taken after a timeout period, the group interaction server application 302 may only provide the device 14 with guest services mode.

Pool data may be made automatically available to all pool members, and data is preferably cached by the LAN 306 on the server 304. If an attendee has requested that the data in the shared data pools 314 be transferred to his/her mobile device 14, then the data download is handled by the data pool download module 320 as part of the group mode. If the attendee has requested that the data be transferred to their home network 12, then the transfer is handled by the guest services module 314 as part of the guest services mode. Data is forwarded to each member's home server 16 in a secure manner. In a preferred embodiment, this is accomplished by the guest services module 314 obtaining the destination address from the mobile device 14 and then forwarding the data in the selected shared data pools to the home network 12. Alternatively, the data may be forwarded to the home network 12 by the group interaction client application 308 in the mobile device 14 after the data is downloaded to the mobile device from the shared data pools 314.

Transmission of the data in the shared data pools 314 can begin as soon as the event begins, and in a preferred embodiment, the data in the data pools 314 is only shared within the timeframe of the event, unless the time required to transmit the data exceeds the timeframe of the event. In one embodiment, the LAN 306 charges a fee for the transfer service.

In contrast to allowing the attendees to upload data to a web site, such as a weblog, the group mode supported by the LAN 306 of present invention provides a data pool 314 that is local and does not require internet access. The advantage of the data pools 314 is that it is private to the LAN 306, and secure fast because no Internet access is required for attendees to post data. The file uploads from the mobile devices 14 to the data pools 314 can be HTTP based, but in a preferred embodiment is file-based.

In operation, an attendee initiates a file upload through a GUI of the group interaction client application 308 on their mobile device 14. A request that includes an information packet is sent from the group interaction client application 308 to the data pool upload module 318, which then validates the attendee based on the information packet sent by mobile device. In a preferred embodiment, the server 304 does not accept anonymous data uploads for security. Otherwise, any uploaded data is available for access by other attendees of the event.

As stated previously, dynamic data pools 314b may be created by respective attendees during the event based on what is happening at the event. Dynamic data pools 314b are generated when something unexpected or unusual happens, or even if expected, when the expected event begins. Dynamic data pools 314b have all the features and functions of the static pool 314a, but are created during the event when needed. For example, an attendee of a sporting event may create a dynamic data pool 314b for uploading photos and videos of the halftime show; or an attendee my want to post photos and video taken of spontaneous stadium violence.

In a preferred embodiment, an attendee creates a dynamic data pool 314b by selecting an option to do so from the GUI of the group interaction client application 308. In response, the group interaction server application 302 creates the dynamic data pool 314b for the requesting attendee. When an attendee has selected the option to upload data to one of the shared data pools 314, the group interaction client application 308 may pole the group interaction server application 302 for a list of current data pools 314, and display the list on the attendee's mobile device 14 to enable the attendee to select which data pool 314 the data to is be sent.

Once the new data pool 314b has been created and populated with data, the group interaction server application 302 may then send a notification to the mobile devices 14 of other attendees that new data pool has been started and allow the other attendees to subscribe to the new data pool 314b. According to a further aspect of the present invention, the friend detection module 322 may use a contacts/friends list stored on the mobile device to automatically detect whether people in the list are in attendance and in communication with the LAN 306 via their mobile devices 14. If so, the group interaction server application 302 may send the notification of the new data pool 314b to the attendee's contacts/friends.

In a preferred embodiment, the group mode only allows members of a registered group to have access to the shared data pool 314a. The registration module 315 may register attendees for access to the data pool 314a ad hoc simply in response to the mobile devices 14 entering the short-distance wireless network area, or the attendees can be "pre-registered" as part of an event registration process. Pre-registration and event registration can simply be in the form of the user providing a user identification message to the registrar prior to, or at the event. The information for each registered attendee is stored in the user database 326 and preferably includes an ID of the attendee, an ID of the attendee's mobile device, and an ID of the mobile device's home network 12, if applicable. When the mobile device 14 of a pre-registered attendee is detected within the LAN 306, the registration module 315 queries the user database 326 with the detected device ID and allows automatic access to the data pool 314a upon arrival. This is a more secure approach than the ad hoc approach, but does require registration (either before or at the event).

In a preferred embodiment, the event services module 324 provides event services from data pools 314. One is to service user requests to print form of any data, such as photos or documents, which can then be picked up at event, or mailed after event. Another service is to allow automatic identification at a pick-up point using the mobile device 14 via device interaction with a machine or person with another device responsible for handing out the requested material. Each service provided may be billed to the requester.

The description above assumes that the group interaction application 302 is configured to serve a private event where the people in attendance have some affiliation that facilitates the need to share data between the attendees through the shared data pools 314. In a further embodiment, however, the group interaction application server 302 may be configured to operate in a public mode for public events in which each attendee has access to the shared data pools 314 provided by the event provider but the data added to the shared data pools 314 by each of the attendees is not shared with other attendees. For example, in the concert example, the photo is taken by the professional photographer may be dynamically added to the static pool 314a for access by the mobile devices 14, but the photos taken by each attendee may be added only to his or her dynamic data pool 314b and are not accessible by other attendees, except by the friends of the attendee who are automatically detected to be in attendance and sent notices regarding the data pool 314 if the user has enabled this mode.

The group modes provided by the LAN 306 will be further explained by way of an example private event in which a company holds a party at the local aquarium for the company employees. The aquarium has a wireless network, and an extensive library of articles and photos on the subject flora and fauna. The company pre-arranges for the party, including pooling of images, videos, and sound from the employees attending the party. Since the company has the information for all devices used by the employees, a pre-registration of devices is easy. In addition, as part of the party fee charged by the aquarium, the aquarium agrees to pre-load the sharing pool with select photos for the employees.

As employees arrive at the aquarium party, their devices are automatically logged into the wireless LAN. If the user has selected to be notified that a group mode data pool is available, then they will receive a notification on their device, and can manually select group mode, guest services mode, or private mode. Other users may have left their device in "automatic select" mode, which will accept the group mode invitation automatically. If the user has selected "private" mode, then no data is shared with the pool. Note that data shared automatically is only data that is captured during the party. Thus, no pre-existing data in a user's device is shared, without explicit request by the owner. Also note that data is shared by being sent to the server by the device. No access to the device memory is granted to the network. This guarantees only data offered by the device can be shared.

When the party begins, employees roam the aquarium, taking videos and photos of friends and aquarium displays. As they do so, the photos are automatically added to the shared data pool, so all employees receive a copy, automatically sent to their "home" server, or, in this case, to the company's server for later download by employees to their own servers, as desired.

The LAN server at the aquarium also may be configured to perform a door prize function. In a door prize function, a winner is randomly selected from available mobile devices, and on random or selected intervals, grants a prize to the winner. The price is announced by the mobile device, and is then claimed by the owner.

Users can also select photos and videos that they do not want shared. This is automatic when a video or image is deleted—it can be deleted only by the device from which it came, and when deleted, will also be deleted wherever copies are located. This can be accomplished by a "delete" command sent to all locations where the image was sent, uniquely identifying the image to be deleted.

Around the aquarium are display screens showing images and videos from the party. Initially, the screens only showed the preloaded images. As images are added to the shared data pool from party-goers, they may be displayed both on display screens located throughout the aquarium and on the display screens of the mobile device, along with the name of the person who provided the image or video. Thus, the images can never be "anonymous"—they are always identified. This reduces or eliminates the possibility of photos being provided that are offensive and cannot be identified. As long as the person offering the photo can be identified, issues can be handled.

A delay between the photo being pooled and when it is first displayed can give the person providing the image time to decide to delete it. This might be a good choice for a potential embarrassing photo, or when several photos are taken, and the best one is kept, and others are deleted.

The display screens of the mobile devices may be touch screens, or the device may have a row of soft keys adjacent to the display screens. If the user has configured the group interaction client application 308 to display images from the shared data pool 314, then "I Like" and "I Dislike" buttons can be displayed under each image. As party members view the images, they can "vote" for images they like or don't like. The group interaction server application 302 uses the votes to display images that are liked more frequently, and display images that are not liked less frequently. This provides an automatic selection system. Photos with the most votes positive can also be granted prizes.

The description above is for a party, but the group interaction modes will work as described for other private events such as for conventions, business meetings, conferences, and so on.

A method and system for automatically providing group interaction modes in a local area network (LAN) for attendees of an event having mobile devices capable of communicating with the local area network has been disclosed. The present invention has been described in accordance with the embodiments shown, and one of ordinary skill in the art will readily recognize that there could be variations to the embodiments, and any variations would be within the spirit and scope of the present invention. For example, the group interaction client application may be implemented to provide a peer-to-peer network and the mobile devices may be provided with data pools directly on the devices. Accordingly, many modifications may be made by one of ordinary skill in the art without departing from the spirit and scope of the appended claims.

I claim:

1. A method for automatically providing group interaction modes in a local area network (LAN) for attendees of an event having mobile devices capable of communicating with the LAN, the method comprising:

providing a shared data pool on the LAN with data created by a provider of the event prior to the event; and providing the LAN with a group mode that includes functions for, enabling attendees to create user data pools on the LAN from their mobile devices during the event, enabling at least a portion of the mobile devices to upload digital image data captured during the event to the LAN for storage in the corresponding user data pools, and enabling at least a portion of the mobile devices to download the data stored in both the shared data pool and other attendee's user data pools for storage, such that one attendee receives the digital image data submitted by the other attendees.

2. The method of claim 1 further including: providing the LAN with a guest services mode that includes functions for, providing each of the mobile devices having an established relationship with a home network pass-through access to the home network via an Internet connection, and selectively forwarding to each mobile device's home network the data in the shared data pool and the user data pools.

3. The method of claim 1 further including: providing the group mode with a first private mode that allows the attendees to configure their mobile devices to receive data from the shared data pool, but not to upload any image data from the mobile devices to the shared data pool.

4. The method of claim 3 further including: providing the group mode with a second private mode that allows the attendees to configure their mobile devices to both receive data from the shared data pool and to add data to the shared data pool.

5. The method of claim 4 wherein the uploaded data is stored in the share data pool in a private non-sharing mode.

6. The method of claim 1 wherein the shared data pool includes at least one static data pool, and the user pools comprises dynamic data pools.

7. The method of claim 6 further including: allowing the static data pool to be empty at a start of the event or to include preloaded data pertaining to the event.

8. The method of claim 6 further including: once one of the attendees has created the dynamic data pool, sending a notification to the mobile devices of other attendees that new data pool has been started.

9. The method of claim 8 further including: using a contacts/friends list stored on the mobile device of the attendee that created the dynamic data pool to automatically detect whether people in the list are in attendance at the event and in communication with the LAN via their mobile devices, and in response sending the notification of the dynamic data pool to the attendee's contacts/friends.

10. The method of claim 1 further including: automatically recognizing the mobile devices as the mobile devices are detected by the LAN and offering the group mode to the mobile devices.

11. The method of claim 10 further including: allowing the mobile device to be preconfigured to either automatically accept the offer for the group mode, or to announce the offer by displaying the offer on the mobile device to the attendee for acceptance or rejection.

12. The method of claim 11 further including: if no action is taken after a timeout period for a particular mobile device, only providing the mobile device guest services mode that includes functions for, providing each of the mobile devices having an established relationship with a home network pass-through access to the home network via an Internet connection, and selectively forwarding to each mobile device's home network the data in the shared data pool and the user data pools.

13. The method of claim 1 further including: enabling transmission of the data in the shared data pool as soon as the event begins, and only transmitted during a timeframe of the event unless a time required to transmit the data exceeds the timeframe of the event.

14. The method of claim 1 further including: providing a group mode such that a group of at least a portion of the mobile devices is formed and only members of the group that have access to the shared data pool, such that the data uploaded from each of the mobile devices is available for download by any of the mobile devices in the group.

15. The method of claim 14 further including: selecting members of the group during a registration process.

16. The method of claim 15 further including: as a result of the registration process, storing for each registered attendee an ID of the attendee, an ID of the attendee's mobile device, and an ID of the mobile device's home network, if applicable.

17. The method of claim 1 further including: providing a group mode for public events in which each attendee has access to the shared data pool provided by the event provider and may add data to the shared data pool, but the data added to the shared data pool by each of the attendees is not shared with other attendees.

18. The method of claim 1 further including: displaying the digital image data uploaded from the mobile devices on at least one display screen for viewing by the attendees during the event.

19. The method of claim 18 further including: enabling the attendees to vote on images they like, and using the votes to display images that are voted for more frequently.

20. The method of claim 2 further including: prior to using the mobile device to establish a connection with the LAN, establishing a home relationship between the mobile device and a server of the home network, such that no additional configuration is required by a user of the mobile device to communicate over the home network once the relationship is established.

21. The method of claim 20 further including: establishing the home relationship by loading information identifying the device into the server to allow the server to recognize the device, and loading information identifying the server into the device to enable the device to interact with the server.

22. A system, comprising:

a LAN comprising a server and a shared data pool;

a plurality of mobile devices in communication with the LAN;

a shared data pool on the LAN containing data created by a provider of the event prior to the event; and a group interaction server application executing on the server for providing the LAN with a group mode that includes functions for, enabling attendees to create user data pools on the LAN from their mobile devices during the event, enabling at least a portion of the mobile devices to upload digital image data captured during the event to the LAN for storage in the corresponding user data pools, and enabling at least a portion of the mobile devices to download the data stored in both the shared data pool and other attendee's user data pools for storage, such that one attendee receives the digital image data submitted by the other attendees.

23. The method of claim 22 wherein the group interaction server application further includes a guest services mode that includes functions for,
providing each of the mobile devices having an established relationship with a home network pass-through access to the home network via an Internet connection, and
selectively forwarding to each mobile device's home network the data in the shared data pool and the user data pools.

24. The system of claim 23 wherein the group mode includes a first private mode that allows the attendees to configure their mobile devices to receive data from the shared data pool, but not to upload any image data from the mobile devices to the shared data pool.

25. The system of claim 24 wherein the group mode includes a second private mode that allows the attendees to configure their mobile devices to both receive data from the shared data pool and to add data to the shared data pool.

26. The system of claim 25 wherein the uploaded data is stored in a private non-sharing mode.

27. The system of claim 22 wherein the shared data pool includes at least one static data pool, and the user pool comprises dynamic data pools.

28. The system of claim 27 wherein the static data pool is either empty at a start of the event or includes preloaded data pertaining to the event.

29. The system of claim 27 wherein once one of the attendees has created the dynamic data pool, the group interaction server application sends a notification to the mobile devices of other attendees that new data pool has been started.

30. The system of claim 29 wherein the group interaction server application uses a contacts/friends list stored on the mobile device of the attendee that created the dynamic data pool to automatically detect whether people in the list are in attendance at the event and in communication with the LAN via their mobile devices, and in response, sends the notification of the dynamic data pool to the attendee's contacts/friends.

31. The system of claim 22 wherein the group interaction server application automatically recognizes the mobile devices as the mobile devices are detected by the LAN and offers the group mode to the mobile devices.

32. The system of claim 29 wherein the mobile device is preconfigured to either automatically accept the offer for the group mode, or to announce the offer by displaying the offer on the mobile device to the attendee for acceptance or rejection.

33. The system of claim 32 wherein if no action is taken after a timeout period for a particular mobile device, the mobile device is only provided with the guest services mode that includes functions for,
providing each of the mobile devices having an established relationship with a home network pass-through access to the home network via an Internet connection, and
selectively forwarding to each mobile device's home network the data in the shared data pool and the user data pools.

34. The system of claim 22 wherein the data in the shared data pool is transmitted as soon as the event begins, and only transmitted during a timeframe of the event unless a time required to transmit the data exceeds the timeframe of the event.

35. The system of claim 22 wherein in the group mode, only a group of at least a portion of the mobile devices have access to the shared data pool, such that the data uploaded from each of the mobile devices is available for download by any of the mobile devices in the group.

36. The system of claim 35 wherein members of the group are selected during a registration process.

37. The system of claim 36 wherein as a result of the registration process, the group interaction server application stores for each registered attendee an ID of the attendee, an ID of the attendee's mobile device, and an ID of the mobile device's home network, if applicable.

38. The system of claim 22 wherein a group mode for public events is provided in which each attendee has access to the shared data pool provided by the event provider and may add data to the shared data pool, but the data added to the shared data pool by each of the attendees is not shared with other attendees.

39. The system of claim 22 wherein the digital image data uploaded from the mobile devices are displayed on at least one display screen for viewing by the attendees during the event.

40. The system of claim 39 wherein the attendees are enable to vote on images they like, and the votes are used to display images that are voted for more frequently.

41. The system of claim 22 wherein prior to using the mobile device to establish a connection with the LAN, a home relationship between the mobile device and a server of the home network is established, such that no additional configuration is required by a user of the mobile device to communicate over the home network once the relationship is established.

42. The system of claim 41 wherein the home relationship is established by loading information identifying the device into the server to allow the server to recognize the device, and loading information identifying the server into the device to enable the device to interact with the server.

* * * * *